(12) United States Patent
Kobayashi

(10) Patent No.: US 7,873,597 B2
(45) Date of Patent: Jan. 18, 2011

(54) DATA MANAGEMENT SYSTEM, UPDATE FILE GENERATING SYSTEM, AND DATA UPDATING METHOD

(75) Inventor: Yukihiko Kobayashi, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 415 days.

(21) Appl. No.: 11/892,601

(22) Filed: Aug. 24, 2007

(65) Prior Publication Data

US 2008/0059502 A1 Mar. 6, 2008

(30) Foreign Application Priority Data

Aug. 29, 2006 (JP) .............................. 2006-232206

(51) Int. Cl.
*G06F 7/00* (2006.01)
*G06F 17/00* (2006.01)

(52) U.S. Cl. ...................... 707/621; 707/628; 707/638; 707/694; 707/695; 707/806

(58) Field of Classification Search ...................... 707/1, 707/620, 621, 628, 638, 694, 695, 803, 806, 707/999.001
See application file for complete search history.

(56) References Cited

U.S. PATENT DOCUMENTS

| | | | | |
|---|---|---|---|---|
| 5,218,695 A | * | 6/1993 | Noveck et al. .............. | 707/205 |
| 5,778,388 A | * | 7/1998 | Kawamura et al. .......... | 707/203 |
| 5,873,118 A | * | 2/1999 | Letwin ...................... | 711/156 |
| 6,026,406 A | * | 2/2000 | Huang et al. ................ | 707/100 |
| 6,216,175 B1 | * | 4/2001 | Sliger et al. ................. | 717/169 |
| 6,738,799 B2 | * | 5/2004 | Dickenson .................. | 709/203 |
| 7,318,054 B2 | * | 1/2008 | Nomura ........................ | 707/1 |
| 2002/0178139 A1 | * | 11/2002 | Chen et al. .................... | 707/1 |
| 2003/0009436 A1 | * | 1/2003 | Broden et al. ................. | 707/1 |
| 2006/0005098 A1 | * | 1/2006 | Lotz et al. ................... | 714/746 |
| 2006/0074547 A1 | * | 4/2006 | Kaufman et al. ............ | 701/200 |
| 2006/0173905 A1 | * | 8/2006 | Lahey et al. ................ | 707/102 |

FOREIGN PATENT DOCUMENTS

| | | | |
|---|---|---|---|
| JP | A 2004-287705 | 10/2004 | |
| JP | A 2005-025672 | 1/2005 | |

\* cited by examiner

*Primary Examiner*—John E Breene
*Assistant Examiner*—Mark E Hershley
(74) *Attorney, Agent, or Firm*—Oliff & Berridge, PLC

(57) ABSTRACT

Systems and methods store data in records, each record comprising a plurality of fields. The systems and methods receive an update file that contains a stored field specifying structure that specifies a field that is to be updated in a particular record and that contains the updated data for the field that is to be updated. The systems and methods then write, for the particular record, the updated data that has been extracted from the update file into the field that has been specified by the stored field specifying structure of the update file.

10 Claims, 6 Drawing Sheets

DATA MANAGEMENT SYSTEM, UPDATE FILE GENERATING SYSTEM, AND DATA UPDATING METHOD

INCORPORATION BY REFERENCE

The disclosure of Japanese Patent Application No. 2006-232206 filed on Aug. 29, 2006, including the specification, drawings and abstract is incorporated herein by reference in its entirety.

BACKGROUND

1. Related Technical Fields

Related technical fields include data management systems, update file generating systems, and data updating methods.

2. Related Art

Navigation apparatuses that have been commercialized in recent years have a built-in high capacity hard disk serving as a storage medium. These navigation apparatuses are provided with a storage medium that stores map data, display the map data on a monitor in combination with the position of the guided vehicle (e.g., detected by a GPS), and provide route guidance to a destination.

A navigation apparatus that is provided with such a hard disk updates data that is stored on the hard disk by receiving an update file via, for example, low capacity media or a predetermined communication network such as a mobile telephone or the like. The navigation apparatus reads and writes desired data on the hard disk from the update file. Such navigation apparatuses do not require replacing a disk such as a DVD or a CD-ROM to update data.

In addition, in such a navigation apparatus, because multiple data is stored on the storage medium in record units, where a record consists of a plurality of fields, data is updated in the record units without updating all of the data that is stored on the storage medium, by "incremental updating" (see, e.g., Japanese Patent Application Publication No. JP-A-2004-287705).

Specifically, in the incremental updating, a record in which even one byte must be updated is designated as an object of updating. An update file that contains the data for an entire new record is then generated. The navigation apparatus receives the input of this update file and the data that is stored on the storage medium is updated by overwriting the entire record that is stored on the storage medium and is the object of updating by the data for the entire record that is contained in the update file. Thus, because the update file does not contain records that do not need to be updated, the volume of the update file is relatively small, and consequently the amount of communication, the memory volume, and the update time for inputting this update file are reduced.

In addition, navigation apparatuses are known that, in addition to carrying out the route guidance described above, information data related to site information is stored on the storage medium, and search guidance for site information is carried out by displaying the information data on a monitor (see, e.g., Japanese Patent Application Publication No. JP-A-2005-25672, and Japanese Industrial Standards D 0810).

SUMMARY

In the above navigation apparatuses provided with a hard disk, extremely large amounts of data are stored on the hard disk. Furthermore, the there are cases in which this large amount of data is frequently updated due to frequent changes in the site information and maps. Thus, even when incremental updating is carried out, the volume of an update file is very large, and the amount of communication, the amount of memory, and the update time for inputting the update file become enormous.

Various exemplary implementations of the broad principles described herein provide a further reduction in the volume of such an update file. Exemplary implementations provide systems and methods wherein the volume of the update file that is used for updating may be made small.

Various exemplary implementations provide systems and methods that may store data in records, each record comprising a plurality of fields. The systems and methods may receive an update file that contains a stored field specifying structure that specifies a field that is to be updated in a particular record and that contains the updated data for the field that is to be updated. The systems and methods may then write, for the particular record, the updated data that has been extracted from the update file into the field that has been specified by the stored field specifying structure of the update file.

DESCRIPTION OF EXEMPLARY IMPLEMENTATIONS

Figure 1:
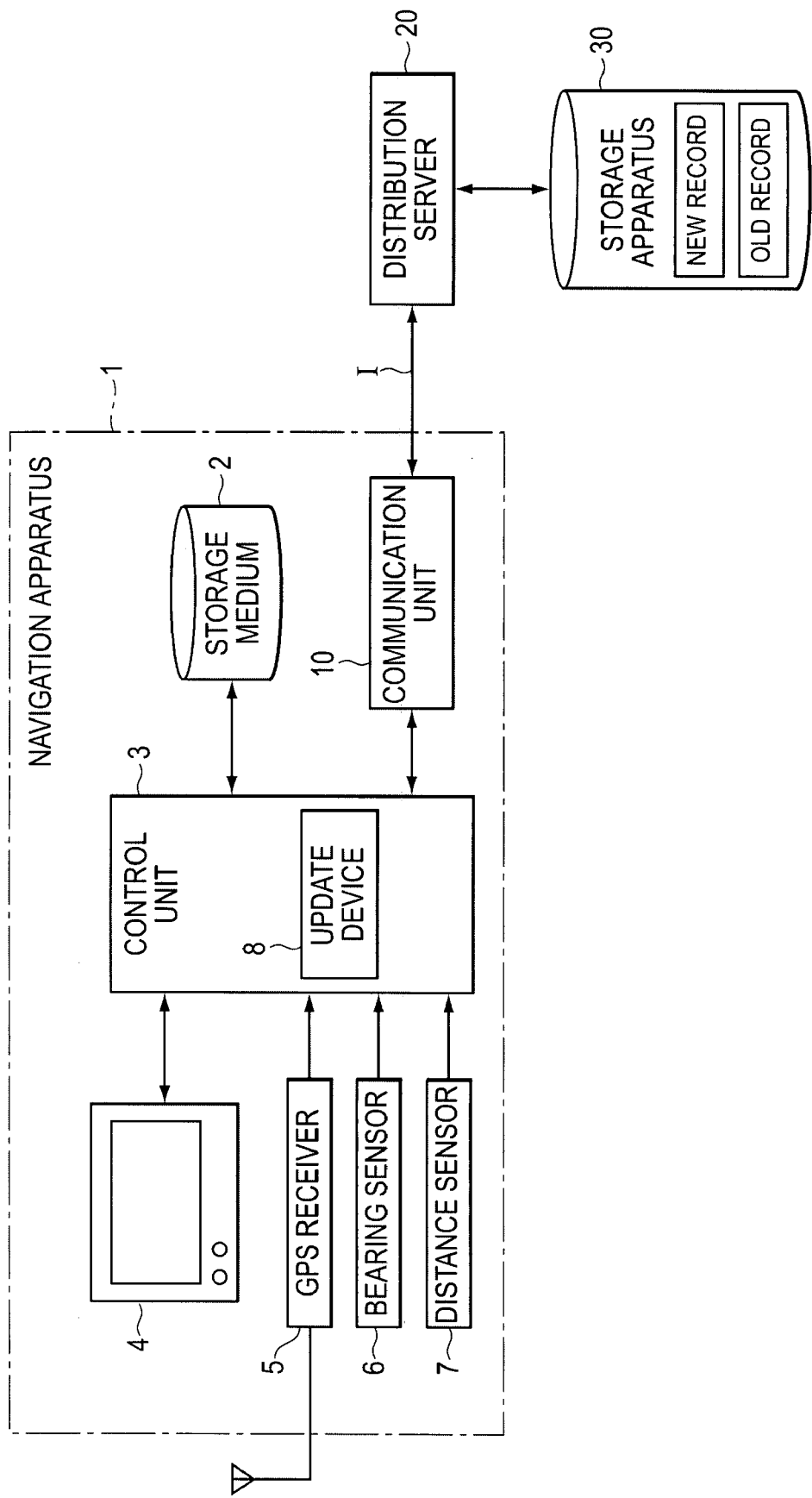
FIG. 1 is a functional block diagram of an exemplary navigation apparatus.

FIG. 1 shoes a navigation apparatus 1 that may be mounted in a vehicle. The navigation apparatus 1 may include a controller 3, which may include, for example, a CPU, may be implemented by hardware, software (programs), or both. The controller may control the various operations for the navigation apparatus 1.

The navigation apparatus may include a rewritable storage medium 2, such as a hard disk, that stores map data related to maps, information data that is related to site information, and the like. This storage medium 2 may be structured as or similar to a hard disk.

The navigation apparatus 1 may provide route guidance to a destination by displaying map data that has been read out from the storage medium 2 on a monitor 4 along with the position of the guided vehicle. The position of the guided vehicle may be detected by a GPS receiver 5.

The GPS receiver 5 may receive GPS signals from GPS (Global Positioning System) satellites. These GPS signals may be received, for example, every other second and may be output to the controller 3. In the controller 3, the received GPS signals may be analyzed, and it is thereby possible to obtain information about the position of the guided vehicle (latitude and longitude), the forward bearing, the travel speed, and the like.

In addition, a bearing sensor 6 that may detect the forward bearing of the vehicle and changes thereof may be provided on this navigation apparatus 1. This bearing sensor 6 may be structured, for example, by a gyroscopic sensor, a geomagnetic sensor, an optical rotating sensor and/or a rotating-type resistance volume sensor that is installed on the rotating portion of the steering wheel, and/or an angle sensor that is installed on the vehicle wheel portion. In addition, the bearing sensor 6 outputs the detected results thereof to the controller 3.

In addition, a distance sensor 7 that may detect the travel distance and speed of the vehicle may be provided on the navigation apparatus 1. This distance sensor 7 may be structured, for example, by a vehicle speed pulse sensor that outputs a pulse signal each time the drive shaft or the wheels or the like of the vehicle rotate by a certain amount, and/or structured by a combination of a yaw or G-force sensor that detects the acceleration of the vehicle and a circuit that carries out double integration on this detected acceleration. The distance sensor 7 may output the detected results to the controller 3.

The controller 3 may obtain map data about the vicinity of the position of the guided vehicle from the storage medium 2 and may carry out various types of arithmetic processing for the route guidance of the vehicle based on this map data and the detected current position of the vehicle. The controller 3 may output control commands to the monitor 4 or the like. In addition, the controller 3 may superimpose images that show the current position of the vehicle on generated map images, and may display the result on the monitor 4. In addition, reports to the driver about route guidance may be made by using the monitor 4 or the like at an specified timing based on the road contours for the forward direction and the like that are included in the map data, and the current position.

The navigation apparatus 1 may carry out search guidance for site information by displaying, in the monitor 4, information data that relates to site information that has been retrieved from the storage medium 2. For example, on the storage medium 2, a plurality of information data that is related to the information for a plurality of sites may be stored in an information data frame, and at the same time, the corresponding data for specifying the information data may be stored in the corresponding data frame for each of the categories, which have been narrowed down by using, for example, search keys of the names of sites represented in 50 syllables of the Japanese language.

In addition, to carry out route guidance by search keys, which represent a pronunciation of site information, a user may input the pronunciation into a prescribed operating unit such as a touch panel-type monitor 4. Then the controller 3 may narrow down the categories using the input pronunciation by referring to a hierarchical structure of categories. The controller 3 may then extract the corresponding data that is included in the narrowed categories from the corresponding data frame, and display the names of the sites and the like that are included in this extracted data on the monitor 4.

Then, when the user selects the name of a site that has been displayed in the touch panel-type monitor 4, the controller 3 may extract the information data that corresponds to the name of the site from the information data frame by referring to an offset to the information data that is included in the data that corresponds to the name of a site that has been selected, and display both the detailed information about the site that is included in this extracted information data and the map data for this site and the like in the monitor 4.

The navigation apparatus 1 may be provided with a communication unit 10 that can receive a predetermined file from a distribution server 20 (described below), via a predetermined communication line I, such as the Internet. Thereby, the communication unit 10 may receives the input of an update file for updating each type of data, such as the map data, the corresponding data, and information data and the like that is stored on the storage medium 2 by receiving the input from the distribution server 20 via the communication line I.

The distribution server 20 may be located, for example, at a manufacturer that sells the navigation apparatus 1, and may consist of a computer that stores and manages data before being updated and the data after being updated in a storage apparatus 30, such as a hard disk, in record units respectively as an old record and a new record.

In addition, the distribution server 20 may generate update files that include a stored field specifying structure that specifies the field that is to be updated in the record and at the same time, include updated data for the field that is to be updated by extracting the differences before and after updating in the record that is the object of updating on the storage apparatus 30. In addition, the distribution server 20 may transmit the generated update file to the navigation apparatus 1 via the communication line I.

Below, the detailed structure of both the distribution server 20 and an update file generating method that may be executed by this distribution server 20 will be explained with reference to FIG. 2 to FIG. 4. Note that FIG. 2 to FIG. 4 are figures for explaining the state in which an update file is generated from the new record and the old record.

This distribution server 20 may be structured such that a new record and an old record in the storage apparatus 30 are compared, for example, by using each permanent ID or name. A record for which the new record and the old record are different may be designated as a record that is the object of updating. For each record that is the object of updating, the following update files may be generated on the storage medium 2: an update file for updating the data of a field of the record that is the object of updating, as shown in FIG. 2; an update file for newly creating a record that is an object of updating on the storage medium 2, as shown in FIG. 3; and an update file for deleting a record that is the object of updating on the storage medium 2, as shown in FIG. 4.

In addition, these update files may include update format data that includes necessary data such as the file information (for example, "record size" and the like) and identification data (for example, "permanent ID," "name data list," and the like) that can identify a record that is the object of updating, and indicates the new generation, updating, and deleting of a record that is an object of updating described above. Below, the update file generating method for the cases in which the update format data indicates an update, a new creation, or a deletion will each be explained.

Figure 2:
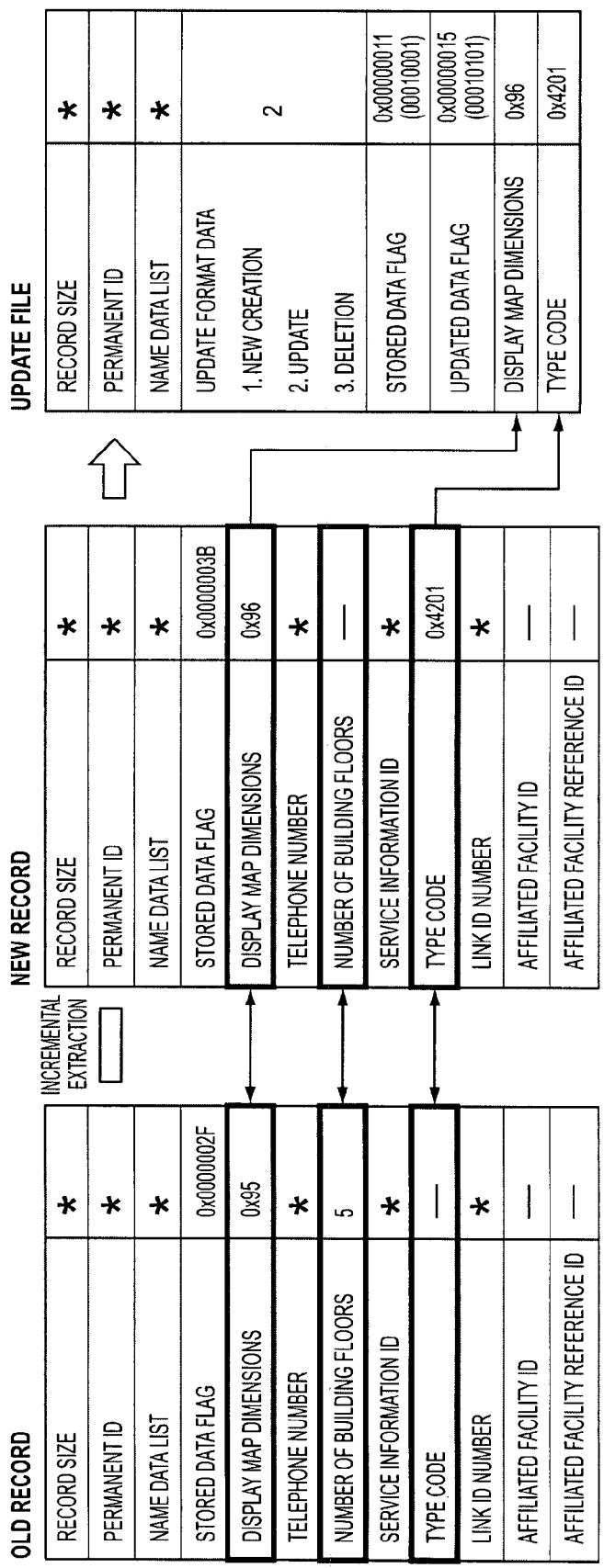
FIG. 2 shows an exemplary update file in which update format data indicates update.
Figure 3:
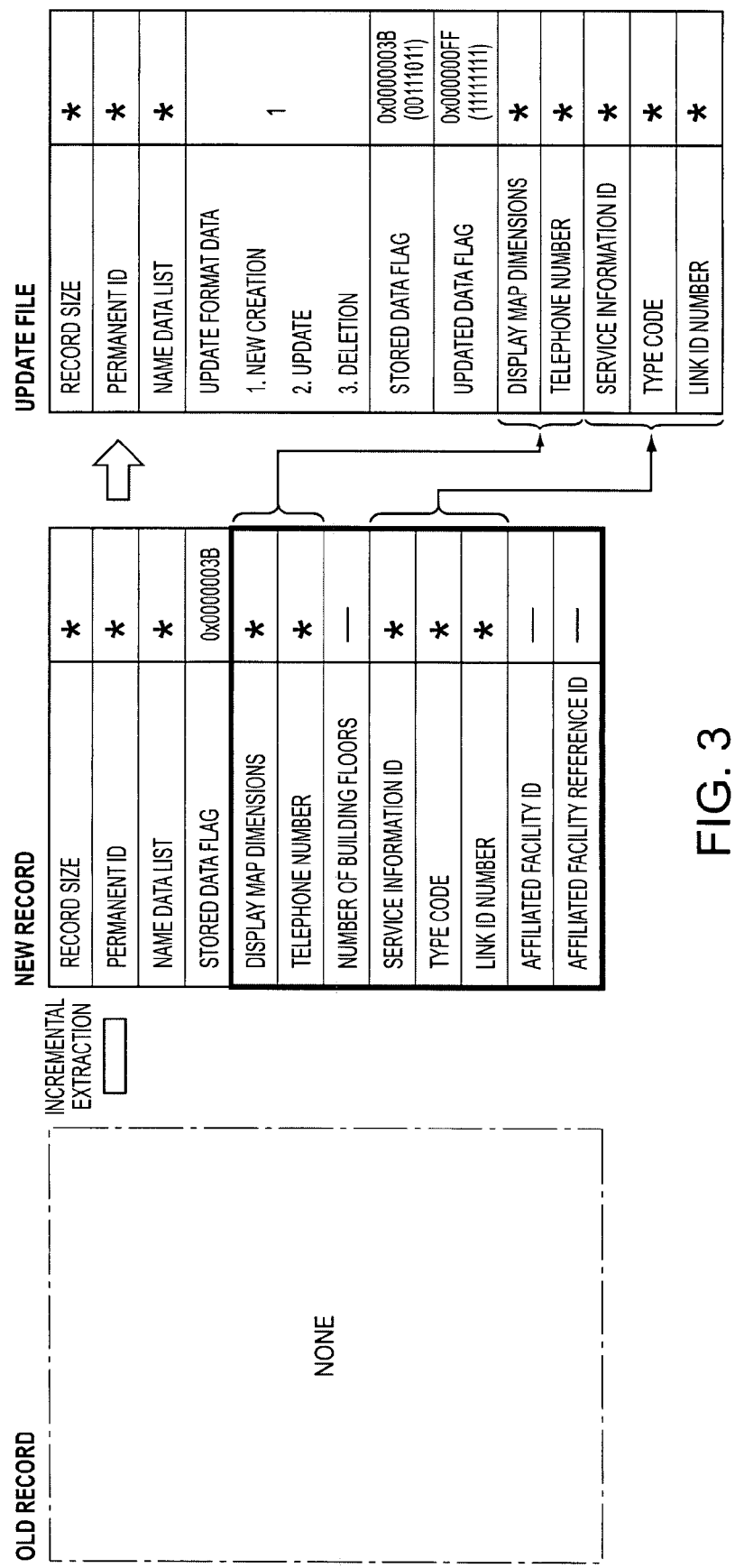
FIG. 3 shows an exemplary update file in which update format data indicates new creation.
Figure 4:
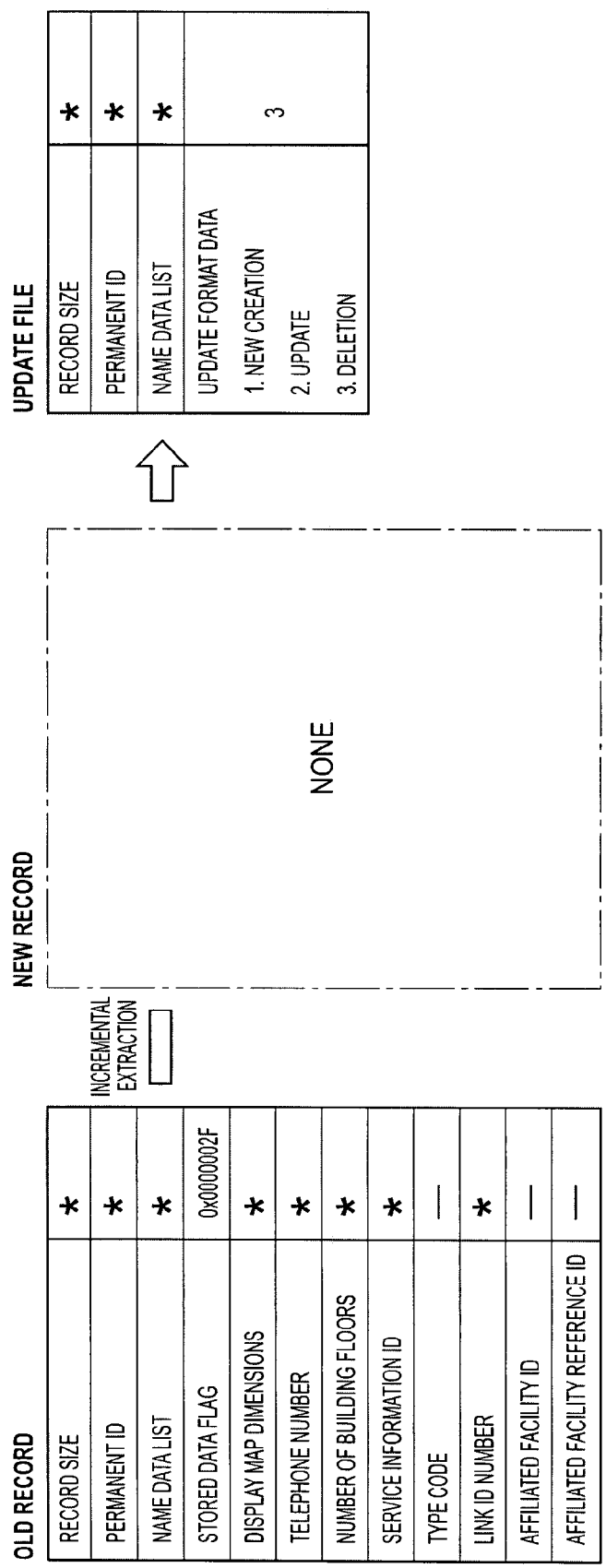
FIG. 4 shows an exemplary update file in which update format data indicates deletion.

Note that in FIG. 2 to FIG. 4, the symbol "*" indicates that a certain type of data is stored in a corresponding field, and the symbol "–" indicates that data of the corresponding field is erased.

As shown in FIG. 2, in the case in which both a new record and an old record, such as a permanent ID, are both present, and the data for at least one field (for example, "display map dimension," "number of building floors," and "type code") in either of the records is different, the distribution server 20 may generates an update file that designates this record as an object of updating, and the update format data may be set to "2," which indicates that, on the storage medium 2, the data in this field of the record is to be updated.

Furthermore, this update file may be generated so as to contain a stored data flag that indicates the presence or absence of updated data for each of a plurality of fields in a corresponding record, and so as to dispose the updated data in the disposition sequence of the plurality of fields in the record. Specifically, in FIG. 2, when the old record and the new record are compared, the new record differs from the old record in the fields for the "display map dimensions," the "number of building floors," and the "type code," and these fields are designated as fields that are to be updated.

In addition, among these fields, because data is present in the new record for the "display map dimensions" and the "type code," an update file may be generated such that the data for the "display map dimensions" and the "type code" in the new record are disposed as updated data in the disposition sequence of the plurality of fields in the record.

Furthermore, the stored data flag may be set as data that shows that there is updated data for the fields for the "display map dimensions" and the "type code," and there is no updated data for any of the other fields. Specifically, the stored data flag may be set to "11," which represents in hexadecimal notation the binary notation "00010001." In this binary notation "00010001," a "1" indicates the presence of updated data and a "0" indicates the absence of updated data. These 1s and 0s are disposed in the disposition sequence of the plurality of fields (here, each bit is associated with a field, and the sequence from upper bits to lower bits is associated with the disposition sequence of the plurality of fields).

In addition, the stored data flag may indicate what field is to be updated by what updated data in the record that is stored on the storage medium 2 and that is the object of updating. That is, the stored data flag functions as a stored field specifying structure that specifies a field that is to be updated in a record that is the object of updating.

Furthermore, the update file is generated so as to include an updated data flag that indicates the presence or absence of an update for each of the plurality of fields in a record that is an object of updating. That is, the updated data flag may be set as data that indicates that the fields of the "display map dimensions," the "number of building floors," and the "type code" are updated, and that there are no other fields to be updated. Specifically, the updated data flag may be set to "15," which represents in hexadecimal notation the binary notation "00010101." In this binary notation "00010101," a "1" indicates that updating is to be carried out and a "0" indicates that updating is not to be carried out. These 1s and 0s are disposed in the disposition sequence of the plurality of fields (here, each bit is associated with a field, and the sequence from the upper bits to the lower bits is associated with the disposition sequence of the plurality of fields). Thereby, the updated data flag that has been set in this manner indicates what fields that are to be updated for a record that is stored on the storage medium 2 and is the object of updating.

In addition, the update format data may be set to "2" by the update file that has been generated in this manner. Thus, it is possible to confirm that a record that is already stored on the storage medium 2 is an object of updating. Furthermore, due to the stored data flag, it is possible to confirm what field is to be updated by what updated data for a record that is stored on the storage medium 2 and is an object of updating. In addition, due to the combination of the stored data flag and the updated data flag, it is possible to confirm what data in what field is to be erased.

Thus, the updated data does not include any data for the fields that do not need to be updated in the record that is the object of updating, and consequently the volume of the updated data can be reduced by an amount that is equivalent to this. As a result, the updating file can be small.

For example, in a field in which the stored data flag is set to "1," which indicates that updated data is present in the update file, and the updated data flag is set to "1," which indicates that updating is to be carried out, the combination of the stored data flag and the updated data flag shows that the data in this field is to be overwritten by updated data that is present in the update file. In a field in which the stored data flag is set to "0," which indicates the absence of updated data in the update file, and the updated data flag is set to "1," which indicates that updating is to be carried out, the combination of the stored data flag and the updated data flag shows that the data in this field is to be erased. In a field in which the stored data flag is set to "0," which indicates the absence of updated data in the update file, and the updated data flag is set to "0," which indicates that updating is not to be carried out, the combination of the stored data flag and the updated data flag shows that the data in this field is to remain as-is.

As shown in FIG. 3, in the case in which a new record is present and an old record is not present, the distribution server 20 may generates an update file in which the corresponding record is designated as an object of updating, and the update format data is set to "1," which indicates that a record that is the object of updating is newly created on the storage medium 2.

Furthermore, this update file may include a stored data flag and an updated data flag, similar to those described above, that function as a stored field specifying structure that specifies a field to be updated in a record that is an object of updating, and disposes the updated data.

Specifically, in FIG. 3, when the old record and the new record are compared, an old record is not present, and thus all of the fields are ones in which the data of the new record differs from that of an old record, and all of these fields are fields to be updated. In addition, among all of these fields, in the fields other than "number of building floors," "affiliated facility ID," and "affiliated facility reference ID," data is present in the new record, and thus an update file is generated such that each data that is present in these new records is designated as updated data and disposed in the disposition sequence of the plurality of fields in this record.

Specifically, the stored data flag may be set as data that shows that there is updated data for fields other than the "number of building floors," "affiliated facility ID," and "affiliated facility reference ID," and that there is no updated data for the fields of the "number of building floors," "the affiliated facility ID," and the "affiliated facility reference ID." Specifically, "10111011" in binary notation may be set to "3B" in hexadecimal notation. In contrast, the updated data flag is set as data that shows that all fields are to be updated, and "11111111" in binary notation may be set to "FF" in hexadecimal notation.

In addition, due to the update file that has been generated in this manner, because the update format data is set to "1," it is possible to confirm that the record that is the object of updating is to be newly created on the storage medium 2. Furthermore, for a record that is the object of updating and that has been newly created on the storage medium 2, due to this stored data flag it is possible to confirm what field should store what updated data. Furthermore, due to the combination of the stored data flag and the updated data flag, it is possible to confirm the data of what field is to be erased.

Thus, the updated data does not include data for a field that is to be erased in the record that is the object of updating, and consequently volume of the updated data can be reduced by an amount that is equivalent to this. As a result, the updating file can be small.

As shown in FIG. 4, in the case in which an old record is present but a new record is not present, the distribution server 20 may generates an update file in which this record is designated as an object of updating, and the update format data is set to "3," which indicates that the record that is the object of updating on the storage medium 2 is to be deleted. Furthermore, because all of the records that are the objects of updating are deleted, this update file does not need to include the stored data flag and the updated data flag described above.

Based on an update file that has been generated in the manner described above, it can be confirmed that the record that is the object of updating on the storage medium 2 is to be deleted because the update format data is set to "3." Thus, the updated data does not include the data for any unnecessary fields in the record that is the object of updating, and consequently the volume of the updated data can be reduced by an amount that is equivalent to this. As a result, the updating file can be small.

As described above, an update file that has been generated by the distribution server 20, which functions as an update file generating system, may be sent to the navigation apparatus 1 via the communication line I. In addition, the controller 3 may read and write the desired data on the storage medium 2 using the update file that has been received by the communication unit 10, and update the data that is stored on the storage medium 2. For records that are the object of updating on the storage medium 2, the updated data that has been extracted from the update file is written in fields that are specified by the stored field specifying structure of the update file.

An exemplary updating method will be explained with reference to FIG. 5 and FIG. 6. The exemplary method may be implemented, for example, by one or more components of the above-described navigation device 1 and/or distribution server 20. However, even though the exemplary structure of the above-described navigation device 1 and/or distribution server 2 may be referenced in the description, it should be appreciated that the structure is exemplary and the exemplary method need not be limited by any of the above-described exemplary structure.

Figure 5:
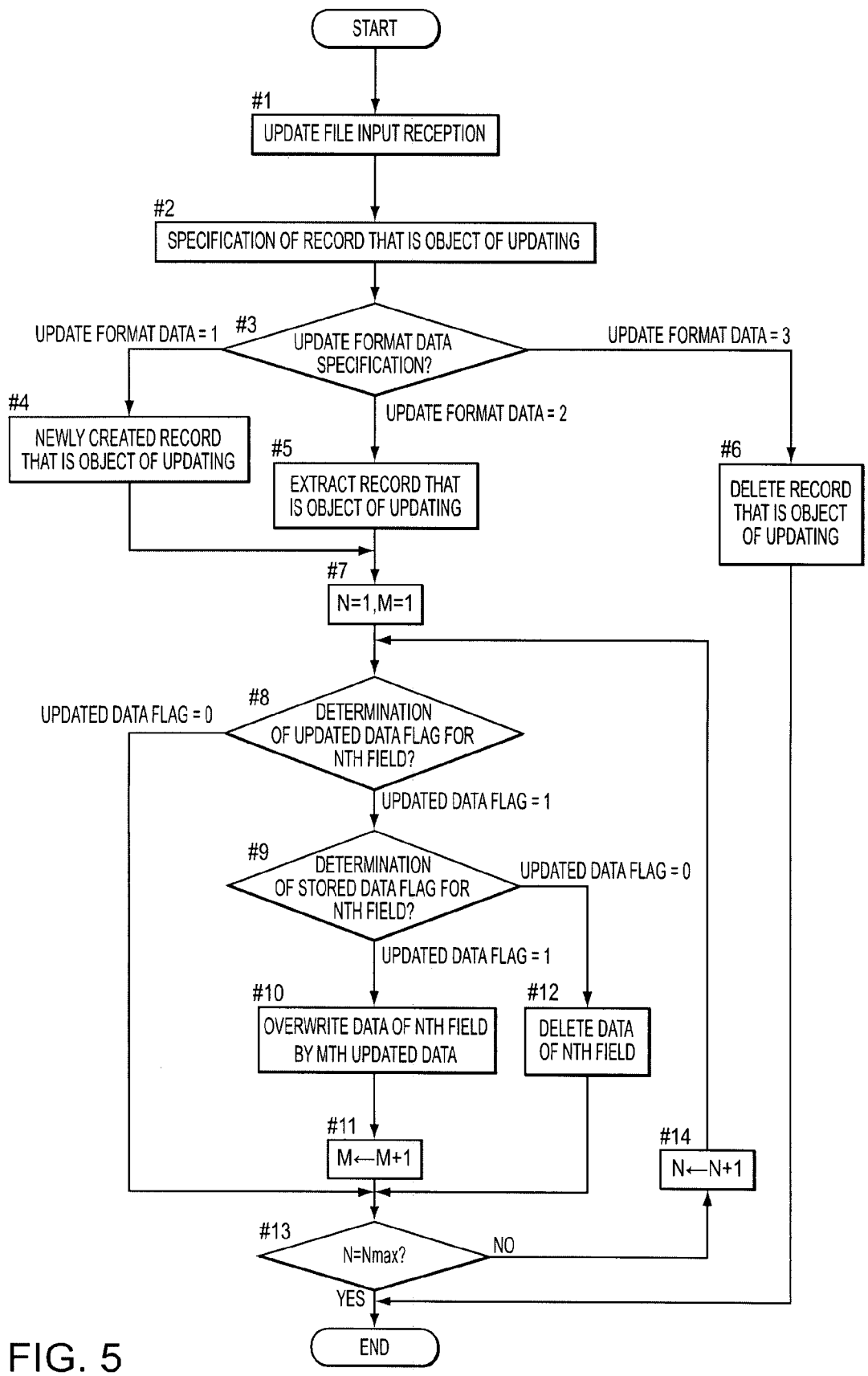
FIG. 5 shoes an exemplary data updating method.

As shown in FIG. 5, the navigation apparatus 1 may start the execution of the data updating method accompanying the execution of the update file input step (step #1), which receives the input of the update file that has been received from the communication unit 10. Here, the update file that has been received from this communication unit 10 may be an update file that has been generated by the distribution server 20 described above.

Next, the update device 8 specifies the record that is the object of updating by using the permanent ID or the name data list or the like that is contained in the update file (step #2), then specifies the update format by using the update format data that is contained in the update file (step #3), and executes appropriate processing, which is described below, on this record that is the object of updating.

Specifically, in the case in which the update format data is set to "1," which indicates that a record is to be newly created, a record that is an object of updating is newly created on the storage medium 2 (step #4). In the case in which the update format data is set to "2," which indicates that a record is to be updated, the record that is the object of updating and that is already stored on the storage medium 2 is extracted (step #5). In the case in which the update format data is set to "3," which indicates that a record is to be deleted, the record that is the object of updating and that is already stored on the storage medium 2 is deleted (step #6).

Note that after executing step #4 and step #5, a variable N and a variable M are set to an initial value of 1 (step #7). Here, the variable N indicates the number of the field in the disposition sequence of the plurality of fields in the record that is the object of updating, and the variable M indicates the number in the description sequence of the updated data of the update file.

Following step #7, the update device 8 determines the presence or absence of an update by using the updated data flag that is contained in the update file for the Nth field in the record that is the object of updating, that is, determines whether or not the data in the Nth field in the record that is the object of updating is to be updated (step #8).

In step #8, in the case in which the updated data flag for the Nth field indicates that there is an update ("1" in binary notation), then for the Nth field, the update device 8 determines the presence or absence of updated data by using the stored data flag that is contained in the update file, that is, determines whether or not there is updated data in the update file that is to be written into the Nth field in the record that is the object of updating (step #9).

In addition, for the Nth field (e.g., the "display map dimensions" and the "type code" in FIG. 6) for which it has been determined in step #8 that the updated data flag indicates that presence of an update ("1 " in binary notation) and for which it has been determined in step #9 that the stored data flag indicates the presence of updated data ("1" in binary notation), the data in the field is updated by being overwritten by the Mth updated data in the update file (step #10). Note that in the case in which the Mth updated data of the update file is used in step #10, the variable M is incremented to M+1 (step #11).

In contrast, for the Nth field (e.g., the "number of building floors" in FIG. 6) for which it has been determined in step #8 that the updated data flag indicates the presence of an update ("1" in binary notation) and for which it has been determined in step #9 that the stored data flag indicates the absence of updated data ("0" in binary notation), the data in the field is updated by deleting (step #12).

Figure 6:
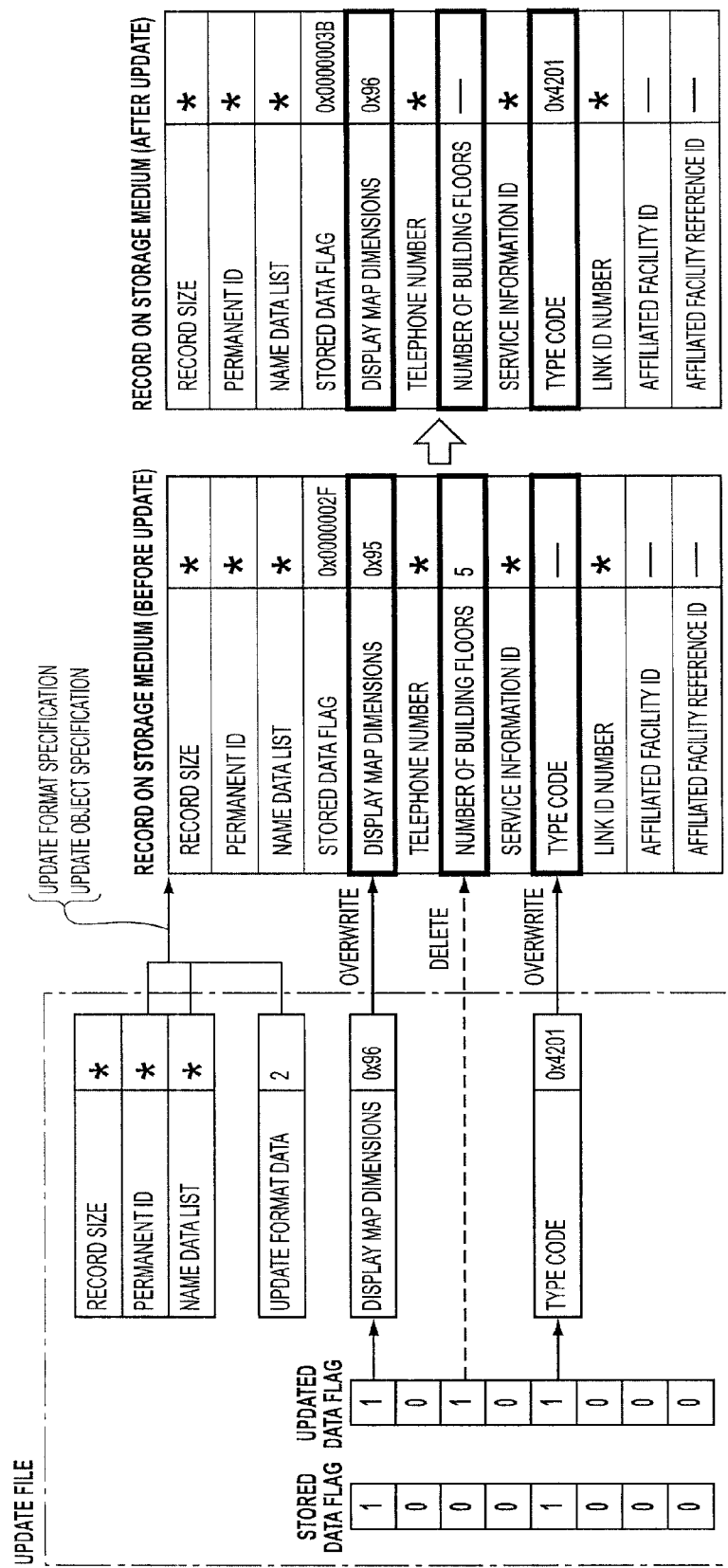
FIG. 6 shows an exemplary updating flow on the storage medium.

In addition, for the Nth field (e.g., the fields other than the "display map dimensions," the "number of building floors," and the "type code" in FIG. 6) for which it has been determined in step #8 that the updated data flag indicates the absence of an update ("0" in binary notation), step #9 to step #12 described above are skipped, and updating is not carried out.

In addition, it is determined whether the number N of the field is equal to the maximum Nmax (for example, 8) (step #13), and until it is determined that N is equal to Nmax, the processing in step #8 to step #12 is repeatedly executed while successively incrementing N to N+1 (step #14).

By using the data updating method described above, for the update file, the data of fields that do not need to be updated are not included in a record that is the object of updating, and consequently the volume of the update file can be reduced by an amount that is equivalent to this. For example, it is possible to reduce the amount of communication, the amount of memory, and the update time for inputting the update file.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, in the above example, the record that is the object of updating may be explained by the example of a record of information data that is used in search guidance for site information. However, such a record is not limited to records for information data, and records of corresponding data and records of the map data may be records that are the objects of updating.

In the above example, the stored field specifying structure, which is contained in the update file, is a stored data flag that indicates the presence or absence of updated data for each of the plurality of fields in a record that is the object of updating.

However, in addition, the stored field specifying structure may be suitably modified to a form in which a field that is to be updated in the record that is the object of updating is specified.

In the example above, in the data updating method, after the presence or absence of an update has been determined in step #8 by the updated data flag that is contained in the update file, the presence or absence of updated data is determined in step #9 by the stored data flag that is contained in the update file. However, in addition, the sequence of the determination by the updated data flag and the determination by the stored data flag may be reversed.

Specifically, a structure is possible in which, first, for a field for which it has been determined by using the stored data flag that updated data is present, the data in this field may be overwritten by the updated data that is registered in the update file, and next, for a field for which it has been determined by using the stored data flag that updated data is absent and for which it has been determined by using the updated data flag that an update is present, the data of this field may be erased.

In above example, the update file is structured so as to have an updated data flag that indicates the presence or absence of an update for each of a plurality of fields in a record that is the object of updating. However, in addition, in the case in which it is not necessary to erase data in a field, the updated data flag may be eliminated in the case in which, for example, the data of the field is erased by being overwritten by blank characters that the update file contains as updated data. In addition, also in the case in which the update format data is "1" and a record is newly created, it is determined that the data in all of the fields is updated, and thus the updated data flag "11111111" in binary notation may be eliminated.

In the above example, the communication unit 10 receives the input of the update file from the distribution server 20 via the communication line I. However, in addition, the update file may be directly input from a distribution server via a communication line such as a USB, or may be suitably modified such that the update file is input from a mobile telephone or media that has downloaded the update file from a distribution server via a communication line such as a USB.

In the embodiment described above, the navigation apparatus 1, which stores data related to site information as information data on the storage medium 2, constitutes a data management system. However, this data management system may be applied to a separate type of system such as a management system for various types of database having a search function for a site search database, a map database, or the like.

The data management system, the update file generating system, and the data updating method according to the present invention may be effectively used to enable making as small as possible the volume of an update file that is used for updating to update data that is stored on a storage medium, for example, in a navigation apparatus.

What is claimed is:

1. A data management system, comprising:
a storage medium that stores data in records, each record comprising a plurality of fields; and
a controller that:
receives an update file that contains:
a stored data flag that indicates a presence or absence of updated data for each of the plurality of fields in a particular record, the updated data for each of the plurality of fields being disposed in a disposition sequence of the plurality of fields in the particular record;
the updated data for the field that is to be updated; and
an updated data flag that indicates the presence or absence of an update for each of the plurality of fields in the particular record;
successively extracts the updated data from the update file in the disposition sequence;
successively writes the corresponding extracted updated data into each of the fields for which the stored data flag indicates the presence of updated data in the disposition sequence; and
erases the data in the field for which the stored data flag indicates the absence of updated data and for which the updated data flag indicates the presence of an update.

2. The data management system according to claim 1, wherein the controller receives the update file via a communication line.

3. The data management system according to claim 1, wherein:
the system is configured as a navigation apparatus; and
the records contain information about sites and maps.

4. The data management system according to claim 1, wherein:
the update file contains identification data that can distinguish each record and update format data that indicates the new creation, update, and deletion of each record; and
the controller:
writes updated data that has been extracted from the update file into each record identified in the identification data and for which the update format data indicates new creation;
writes updated data that has been extracted from the update file into each record identified in the identification data and for which the update format data indicates update; and
deletes each record on the storage medium identified in the identification data and for which the update format data indicates deletion.

5. The data management system according to claim 1, further comprising:
an update file generating system that generates the update file, the update file generating system comprising a server that:
generates the update file that contains the stored data flag and the updated data for the field that is to be updated by extracting the differences in the particular record before and after the updating.

6. A data updating method, comprising:
storing data in records, each record comprising a plurality of fields; and
receiving an update file that contains:
a stored data flag that indicates a presence or absence of updated data for each of the plurality of fields in a particular record, the updated data for each of the plurality of fields being disposed in a disposition sequence of the plurality of fields in the particular record;
the updated data for the field that is to be updated; and
an updated data flag that indicates the presence or absence of an update for each of the plurality of fields in the particular record;
successively extracting the updated data from the update file in the disposition sequence;
successively writing the corresponding extracted updated data into each of the fields for which the stored data flag indicates the presence of updated data in the disposition sequence; and erasing the data in the field for which the stored data flag indicates the absence of updated data and for which the updated data flag indicates the presence of an update.

7. The data updating method according to claim 6, further comprising receiving the update file via a communication line.

8. The data updating method according to claim 6, wherein:
the method is usable with a navigation apparatus; and
the records contain information about sites and maps.

9. The data updating method according to claim 6, wherein:
the update file contains identification data that can distinguish each record and update format data that indicates the new creation, update, and deletion of each record; and
the method further comprises:
  writing updated data that has been extracted from the update file into each record identified in the identification data and for which the update format data indicates new creation;
  writing updated data that has been extracted from the update file into each record identified in the identification data and for which the update format data indicates update; and
  deleting each record on the storage medium identified in the identification data and for which the update format data indicates deletion.

10. A data management system, comprising:
means for storing data in records, each record comprising a plurality of fields; and
means for receiving an update file that contains:
  a stored data flag that indicates a presence or absence of updated data for each of the plurality of fields in a particular record, the updated data for each of the plurality of fields being disposed in a disposition sequence of the plurality of fields in the particular record;
  the updated data for the field that is to be updated; and
  an updated data flag that indicates the presence or absence of an update for each of the plurality of fields in the particular record;
means for successively extracting the updated data from the update file in the disposition sequence;
means for successively writing the corresponding extracted updated data into each of the fields for which the stored data flag indicates the presence of updated data in the disposition sequence; and
erasing the data in the field for which the stored data flag indicates the absence of updated data and for which the updated data flag indicates the presence of an update.

\* \* \* \* \*